(12) United States Patent
Nishikawa et al.

(10) Patent No.: US 10,382,219 B2
(45) Date of Patent: Aug. 13, 2019

(54) METHOD, APPARATUS, AND NON-TRANSITORY COMPUTER-READABLE RECORDING MEDIUM STORING PROGRAM FOR ESTIMATING OPERATOR

(71) Applicant: Panasonic Intellectual Property Corporation of America, Torrance, CA (US)

(72) Inventors: Takayuki Nishikawa, Osaka (JP); Mitsuhiro Matsunaga, Kyoto (JP)

(73) Assignee: PANASONIC INTELLECTUAL PROEPRTY CORPORATION OF AMERICA, Torrance, CA (US)

( * ) Notice: Subject to any disclaimer, the term of this patent is extended or adjusted under 35 U.S.C. 154(b) by 160 days.

(21) Appl. No.: 15/486,380

(22) Filed: Apr. 13, 2017

(65) Prior Publication Data

US 2017/0310499 A1 Oct. 26, 2017

(30) Foreign Application Priority Data

Apr. 20, 2016 (JP) ................................. 2016-084102

(51) Int. Cl.
*H04W 24/00* (2009.01)
*H04L 12/28* (2006.01)
*H04W 4/02* (2018.01)

(52) U.S. Cl.
CPC ......... *H04L 12/2823* (2013.01); *H04W 4/023* (2013.01)

(58) Field of Classification Search
CPC .. G01S 5/0252; H04L 29/08657; H04W 4/02; H04W 4/029; H04W 64/00
See application file for complete search history.

(56) References Cited

U.S. PATENT DOCUMENTS

2012/0302226 A1* 11/2012 Jesudason ............... H04W 4/80
455/420
2014/0167929 A1* 6/2014 Shim ...................... G08C 17/02
340/12.5

(Continued)

FOREIGN PATENT DOCUMENTS

JP 2002-278639 9/2002
JP 2008-267741 11/2008

*Primary Examiner* — Shantell L Heiber
(74) *Attorney, Agent, or Firm* — Greenblum & Bernstein, P.L.C.

(57) ABSTRACT

A method for estimating an operator of multiple electrical devices installed in a building, includes receiving, from each of the multiple electrical devices, an operation log indicating that a corresponding electrical device was operated, the operation log including an ID of the corresponding to electrical device and a time at which the corresponding electrical device was operated; receiving first positional information indicating a current position of a terminal of a user; determining, in a case where a distance between the current position and a position of the building is a predetermined distance or less, that the user entered the building; and estimating that the first user is an operator of a first electrical device indicated by an first operation log corresponding to the time at which the first positional information was received, when it is determined that the first user entered the building from outside of the building.

21 Claims, 11 Drawing Sheets

(56) References Cited

U.S. PATENT DOCUMENTS

| | | | |
|---|---|---|---|
| 2015/0159893 A1* | 6/2015 | Daubman | G05B 15/02 700/278 |
| 2016/0071129 A1* | 3/2016 | Ohhara | G06F 17/30144 705/7.32 |
| 2016/0156766 A1* | 6/2016 | Nishikawa | H04M 1/72533 455/420 |

* cited by examiner

FIG. 3

| POSITIONAL INFORMATION TERMINAL ID | CURRENT POSITION |
|---|---|
| mobile-a | xxx |
| mobile-b | yyy |
| mobile-c | zzz |

FIG. 4

| POSITIONAL INFORMATION TERMINAL ID | FAMILY MEMBER ID |
|---|---|
| mobile-a | a (FATHER) |
| mobile-b | b (MOTHER) |
| mobile-c | c (CHILD) |

FIG. 5

| FAMILY MEMBER ID | ELAPSED TIME (SECONDS) |
|---|---|
| a (FATHER) | 180 |

FIG. 6

| DEVICE OPERATION INFORMATION | | | OPERATOR INFORMATION | |
|---|---|---|---|---|
| OPERATION TIME | HOUSEHOLD ELECTRICAL DEVICE ID | DETAILS OF OPERATION | FAMILY MEMBER ID | WEIGHTING INFORMATION |
| 20:01 | device-A | ON | a (FATHER) | +10 |
| ... | ... | ... | ... | ... |
| 20:05 | device-A | OFF | a (FATHER) | +5 |
| ... | ... | ... | ... | ... |
| 20:10 | device-B | VOLUME INCREASED | — | — |
| ... | ... | ... | ... | ... |

FIG. 7

| HOUSEHOLD ELECTRICAL DEVICE ID | NAME OF HOUSEHOLD ELECTRICAL DEVICE | FAMILY MEMBER ID OF USER |
|---|---|---|
| device-A | HOUSEHOLD ELECTRICAL DEVICE A | a (FATHER), b (MOTHER), c (CHILD) |
| device-B | HOUSEHOLD ELECTRICAL DEVICE B | a (FATHER), b (MOTHER), c (CHILD) |
| device-C | HOUSEHOLD ELECTRICAL DEVICE C | a (FATHER), b (MOTHER), c (CHILD) |
| ... | ... | ... |

FIG. 8

| HOUSEHOLD ELECTRICAL DEVICE ID | a (FATHER) | b (MOTHER) | c (CHILD) |
|---|---|---|---|
| device-A | 22.5 | 2.5 | 0 |
| device-B | 22.5 | 2.5 | 0 |
| device-C | 20.0 | 25.0 | 10.0 |
| ... | ... | ... | ... |

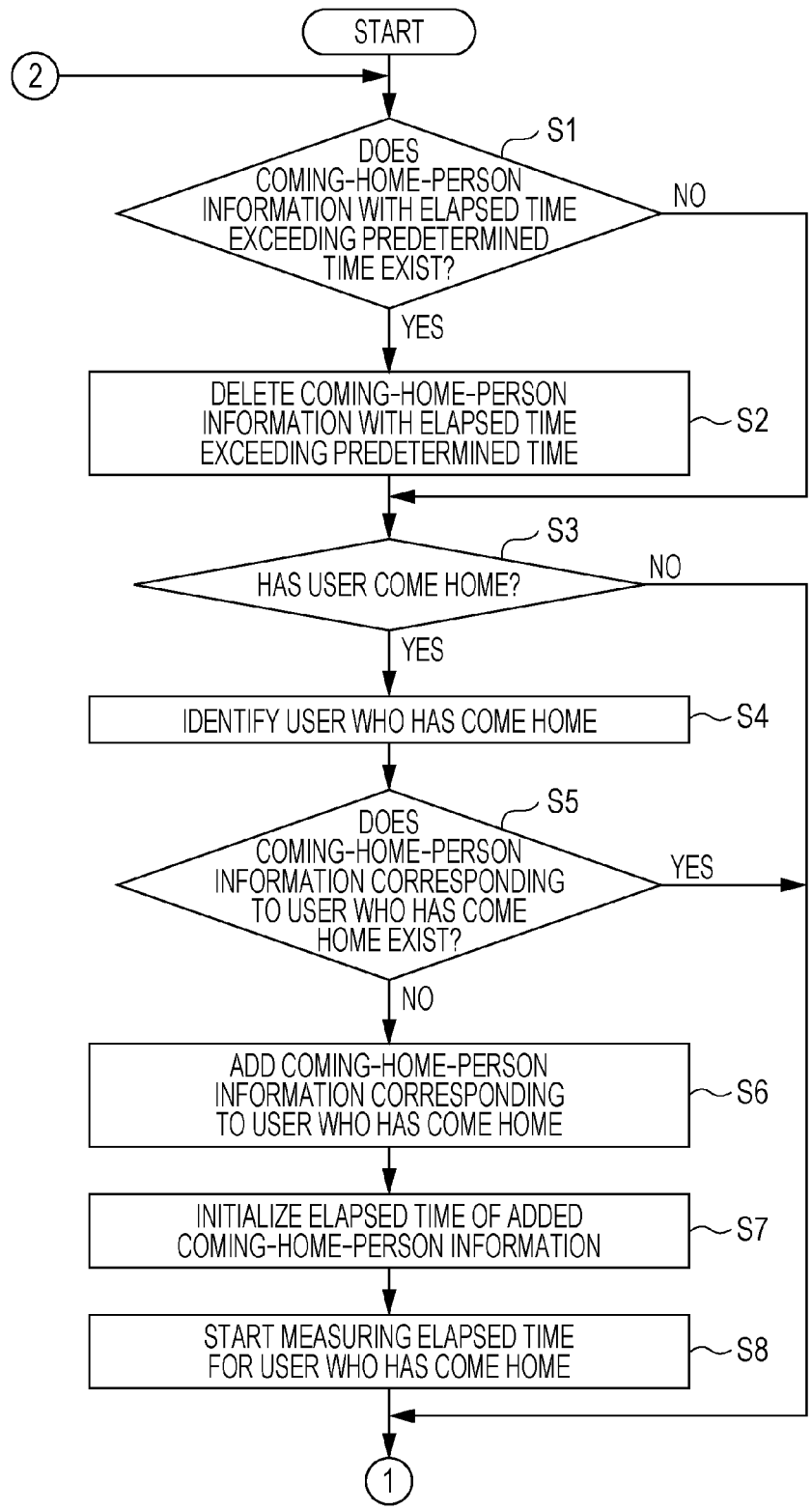

METHOD, APPARATUS, AND NON-TRANSITORY COMPUTER-READABLE RECORDING MEDIUM STORING PROGRAM FOR ESTIMATING OPERATOR

BACKGROUND

1. Technical Field

The present disclosure relates to a method, an apparatus, and a non-transitory computer-readable recording medium storing a program for estimating operators of two or more electrical devices installed inside a building.

2. Description of the Related Art

In recent years, device control systems for identifying, based on use histories or the like of a household electrical device arranged at home, a user who uses the household electrical device and controlling the household electrical device according to the identified user, have been available.

SUMMARY

However, further improvements have been required for related art.

In one general aspect, the techniques disclosed here feature a method for estimating an operator of multiple electrical devices, the multiple electrical devices being installed in a building, the method comprising: receiving, from each of the multiple electrical devices, an operation log indicating that a corresponding electrical device was operated, the operation log including i) an ID of the corresponding electrical device and ii) a time at which the corresponding electrical device was operated; receiving first positional information indicating a current position of a first terminal of a first user, the first terminal of the first user being carried or worn by the first user; determining, in a case where a distance between the current position indicated in the first positional information and a position of the building is a predetermined distance or less, that the first user entered the building from outside of the building; and estimating that the first user is an operator of a first electrical device indicated by an first operation log corresponding to the time at which the first positional information was received, when it is determined that the first user entered the building from outside of the building.

It should be noted that general or specific embodiments may be implemented as a system, a method, an integrated circuit, a computer program, a storage medium, or any selective combination thereof.

According to the present disclosure, a user who uses an electrical device arranged inside a building most frequently may be estimated easily.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of terminal positional information stored in a positional information storing unit;

FIG. 4 is a diagram illustrating an example of user information stored in a user information storing unit;

FIG. 5 is a diagram illustrating an example of coming-home-person information stored in a coming-home-person information storing unit;

FIG. 6 is a diagram illustrating an example of operation histories stored in an operation history storing unit;

FIG. 7 is a diagram illustrating an example of household electrical device information stored in a household electrical device information storing unit;

FIG. 8 is a diagram illustrating an example of user estimation information stored in a user estimation information storing unit;

FIG. 9 is a first flowchart for explaining an operation of an operator estimation system according to the first embodiment;

Figure 1:
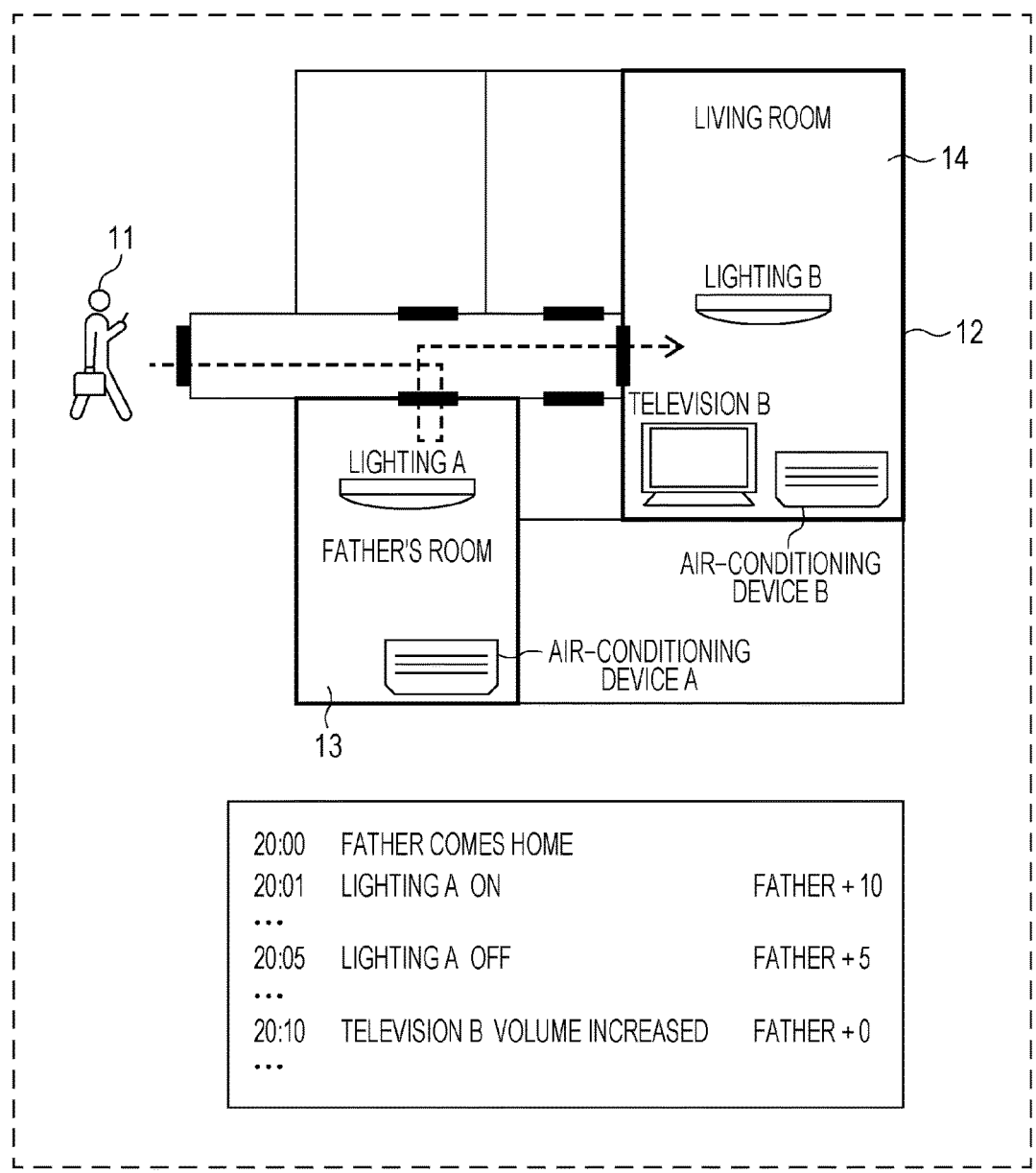
FIG. 1 is a schematic diagram for explaining an overview of an operator estimation system according to a first embodiment of the present disclosure.

DETAILED DESCRIPTION (Underlying Knowledge Forming Basis of the Present Disclosure)

The underlying knowledge forming basis of the present disclosure will be described below.

For example, household electrical devices arranged at home include household electrical devices shared among family members and household electrical devices used by a specific user of the family. The household electrical devices shared among family members include, for example, a lighting device, air-conditioning device, and a television set arranged in a living room. The household electrical devices used by a specific user of the family include, for example, a lighting device, an air-conditioning device, and a television set arranged in a room of the specific user.

To automatically control a household electrical device arranged at home instead of direction operation by a user, it is necessary to identify a family member who uses the household electrical device and to set in advance the details of control for the household electrical device for each family member. For example, a family member may be identified by capturing an image of the face of a user who uses a household electrical device with a camera and authenticating the captured face image. In this case, however, each household electrical device needs to be provided with a camera, which requires a cost.

Furthermore, in the case where the details of control for a household electrical device is set in advance for each family member, it takes time and effort to complete setting and registration, and the details of control may not be automatically changed according to a change of user's preference and an environmental change such as a temperature change. Learning, based on past operation log information of a household electrical device, the details of control for the household electrical device for each family member and automatically changing the details of control for each family member according to a learning result is also possible. In this case, however, information indicating which family member performed an operation needs to be associated with operation log information. For example, by a remote operation for a household electrical device connected to a network using a smartphone carried by a family member, the owner of the smartphone and operation log information may be associated with each other. However, a user who is staying at home often operates a household electrical device using a switch provided at the main body of the household electrical device or a remote controller attached to the household electrical device. Therefore, it is difficult to always operate a household electrical device using a smartphone.

For example, in Japanese Patent No. 4809805, with a portable device, a reception device, a device controller, or the like, the location of a user at or outside home is identified. Based on the relationship between the identified location and operation histories of a lighting device and an air-conditioning device provided near the location, action histories of the user are stored in the device controller. The device controller analyzes high-frequency actions based on the action histories, and controls the lighting device and/or air-conditioning device based on information of the analyzed high-frequency actions. Accordingly, a device control system with which a user may enjoy, without wasting energy, comfortable and convenient indoor environment from the point in time when the user moves to a target location is provided.

Furthermore, for example, in Japanese Unexamined Patent Application Publication No. 2002-278639, a domestic network system where multiple household electrical devices and a server are connected via a domestic network is disclosed. The devices each include at least one of a proximity sensor for detecting proximity information of user tags for which individual IDs are set and a human sensor for detecting positional information of the users of the device, and the server determines the movement condition of a user by identifying positional information and ID information obtained from the sensor and controls the device based on a determination result.

In the device control system described in Japanese Patent No. 4809805, in order to identify a user who uses a device, users need to always carry their portable devices, and reception devices for receiving identification information transmitted from the portable devices carried by the users need to be provided near all the devices arranged at home. Therefore, the configuration of the device control system is complicated, and the cost increases.

Furthermore, also in the network system described in Japanese Unexamined Patent Application Publication No. 2002-278639, in order to identify a user who uses a device, users need to always carry tags, and sensors for detecting IDs transmitted from the tags carried by the users need to be provided at all the devices at home. Therefore, the configuration of the network system is complicated, and the cost increases.

In order to solve the above problems, the present inventor has discussed improvement measures described below.

(1) According to an aspect of the present disclosure, a method for estimating operators of multiple electrical devices, the multiple electrical devices being installed in a building, includes:

receiving, from each of the multiple electrical devices, an operation log indicating that the electrical device was operated, the operation log including an ID corresponding to the operated electrical device and a time at which the electrical device was operated;

receiving first positional information indicating a current position of a terminal of a user, the terminal of the user being carried or worn by the user;

determining, in a case where a distance between the current position indicated in the first positional information and a position of the building indicated in second positional information is a predetermined distance or less, that the user entered the building from outside of the building; and generating operation information in which an operation log corresponding to a time at which the first positional information was received and a user ID corresponding to the user are associated with each other, the user being associated with the operation log as an operator of an electrical device indicated by the operation log corresponding to the time at which the first positional information was received.

With this configuration, an operation performed by a user is estimated, and operator information indicating that the estimated operation was performed by the user is added to a device operation log corresponding to the estimated operation. Therefore, a user who uses an electrical device arranged inside a building most frequently may be easily estimated.

(2) According to the above aspect, an operation time at which an operation was performed, the operation time being indicated in the operation log corresponding to the time at which the first positional information was received, may be within a predetermined period from the time at which the first positional information was received.

With this configuration, it may be determined that an electrical device operated immediately after a user entered a building was operated by the user who entered the building. Therefore, it may be estimated that an operation performed within a period from the time at which the user entered the building to a time at which a predetermined time has passed was an operation performed by the user.

(3) According to the above aspect, the method may further include:

generating the operation information in which predetermined weighting information is associated with the user ID, and the weighting information may indicate a probability that the user corresponding to the user ID is the operator of the electrical device indicated in the operation log.

With this configuration, by comparing weighting information of multiple users who may use an electrical device, an operator who operates the electrical device most frequently among the multiple users may be easily estimated.

(4) According to the above aspect, the weighting information may be determined, based on the operation time indicated in the operation log and the time at which the first positional information was received, such that the weighting information decreases as a difference between the operation time indicated in the operation log and the time at which the first positional information was received increases.

With this configuration, based on weighting information, which is a value decreasing in accordance with the elapsed time from the time at which a user enters a building, an operator who operates an electrical device most frequently among multiple users may be estimated more reliably.

(5) According to the above aspect, the weighting information may be constant irrespective of the operation time indicated in the operation log.

With this configuration, based on weighting information, which is a constant value at any time, an operator who operates an electrical device most frequently among multiples users may be easily estimated.

(6) According to the above aspect, the method may further include storing, as history information, multiple pieces of operation information generated by repeatedly performing the reception of the operation log, the reception of the first positional information, the determination, and the generation of the operation information;

calculating, in a case where user IDs corresponding to multiple users are included in the history information, an operation frequency of each of the multiple users for each of the multiple devices; and generating user information in which each of corresponding users and corresponding operation frequency are associated with the multiple devices.

With this configuration, based on user information indicating the ratio of use of an electrical device by each of two or more users, a user who uses the electrical device most frequently may be easily estimated.

(7) According to the above aspect, in the operation information, predetermined weighting information may be associated with the user ID, and the operation frequency may be calculated based on the weighting information.

With this configuration, based on weighting information, the operation frequency may be calculated.

(8) According to the above aspect, the operation frequency may be calculated based on all the pieces of operation information included in the history information.

With this configuration, based on operation information corresponding to the whole period included in history information, the operation frequency may be calculated.

(9) According to the above, aspect, the operation frequency may be calculated based on operation information corresponding to an operation time within a period from a time at which the last operation was performed, the time being indicated in operation information included in the history information, to a time before a predetermined time.

With this configuration, based on operation information within a period from a time in history information at which the last operation was performed to a time before a predetermined period.

(10) According to the above aspect, the method may further include:

displaying the user information on a display provided at the terminal of the user or a predetermined terminal.

With this configuration, user information may be displayed on a predetermined display.

(11) According to the above aspect, the operation time indicated in the operation log corresponding to the time at which the first positional information was received may be within a predetermined period from the time at which the first positional information was received, and the method may further include:

estimating, based on the user information, an electrical device for which the frequency at which an operation is performed by a first user among the multiple users is equal to or more than a predetermined value; and generating, in a case where an electrical device indicated in an operation log corresponding to a time after the predetermined period has passed since the time at which the first positional information corresponding to the first user was received is equal to the estimated electrical device, the operation information in which the operation log corresponding to the time after the predetermined period has passed and the first user are associated with each other.

With this configuration, even in a case where a time at which an operation was performed is after a predetermined time has passed since the time at which a user entered a building, it may be estimated that an operator of the same electrical device as an electrical device for which the ratio of use by the user who entered the building is a predetermined value or more is the user who entered the building.

(12) According to the above aspect, the method may further include:

generating the operation information in which an operation log corresponding to a time within the predetermined period from the time at which the predetermined period has passed and the first user are associated with each other.

With this configuration, even in a case where a predetermined time or more has passed since the time at which a user entered a building, it may be estimated that an operator of an electrical device for which an operator was estimated is the user who entered the building.

(13) According to the above aspect, the user may include multiple users, the first positional information may be received from a terminal of a user corresponding to each of the multiple users, and in a case where the first positional information is received at the same time from the terminals of the individual users, the determination may not be performed.

With this configuration, in a case where two or more users entered a building within a predetermined period, an operation performed by a user may not be estimated. Therefore, unnecessary processing may be omitted.

(14) According to the above aspect, the user may include multiple users, the first positional information may further include an ID of the terminal of the user, and the method may further include:

estimating, based on user information in which the first positional information and multiple user IDs corresponding to the multiple users are associated with each other, the user corresponding to the first positional information; and determining that the estimated user entered the building from outside of the building.

With this configuration, one of one or more users as estimation targets may be identified as a user who entered a building.

(15) According to the above aspect, the multiple users may include a second user and a third user, and the third user does not carry or wear a corresponding terminal, and the user information may further include identification information indicating that the third user does not carry or wear the corresponding terminal, and the identification information includes a user ID corresponding to the third user, and the method may further include:

generating, in a case where the current position indicated in the first positional information corresponding to the second user is the predetermined distance or more away from the position of the building indicated in the second positional information, the operation information in which the operation log corresponding to the time at which the first positional information corresponding to the second user was received and the user ID corresponding to the third user are associated with each other, based on the identification information.

With this configuration, in a case where an electrical device is operated while a user who carries or wears a user terminal is not present at the building, it may be estimated that the operation on the electrical device was performed by a terminal non-possessing user who does not carry or wear a user terminal.

(16) According to the above aspect,
the first positional information may be received with predetermined time intervals, and
the predetermined time intervals may change in accordance with the distance between the current position indicated in the first positional information and the position of the building indicated in the second positional information.

With this configuration, in a case where a user terminal is located at a position away from a building, by increasing the time intervals with which the user terminal transmits current positional information, power consumption may be reduced. Furthermore, in a case where the user terminal is located at a position near the building, by decreasing the time intervals with which the user terminal transmits current positional information, a determination as to whether or not the user has entered the building may be performed more accurately.

(17) According to another aspect of the present disclosure, an apparatus for estimating operators of multiple electrical devices, the multiple electrical devices being installed in a building, includes:
a memory; and
a processor,
wherein the processor receives, from each of the multiple electrical devices, an operation log indicating that the electrical device was operated, the operation log including an ID corresponding to the operated electrical device and a time at which the electrical device was operated,
receives first positional information indicating a current position of a terminal of a user, the terminal of the user being carried or worn by the user,
determines, in a case where a distance between the current position indicated in the first positional information and a position of the building indicated in second positional information stored in the memory is a predetermined distance or less, that the user entered the building from outside of the building, and
generates operation information in which an operation log corresponding to a time at which the first positional information was received and a user ID corresponding to the user are associated with each other, the user being associated with the operation log as an operator of an electrical device indicated by the operation log corresponding to the time at which the first positional information was received.

With this configuration, an operation performed by a user is estimated, and operator information indicating that the estimated operation was performed by the user is added to a device operation log corresponding to the estimated operation. Therefore, a user who uses an electrical device arranged inside a building most frequently may be easily estimated.

Embodiments of the present disclosure will be described below with reference to the attached drawings. The embodiments provided below are embodiments of the present disclosure and are not intended to limit the technical scope of the present disclosure.

First Embodiments

A household electrical device operated immediately after a user comes home is highly likely to be operated by the user who comes home. In a first embodiment, when a user came home, the user who came home is identified, and it is determined that a household electrical device operated within a predetermined time from the time at which the user came home was operated by the identified user.

FIG. 1 is a schematic diagram for explaining an overview of an operator estimation system according to the first embodiment of the present disclosure.

For example, a father 11, who is a family member, carries a positional information terminal which automatically transmits the current positional information with predetermined time intervals. In the case where the father 11 came home 12 at 20:00, the operator estimation system identifies, based on the current positional information transmitted from the positional information terminal, that the person who came home is the father 11. Then, it is determined that a household electrical device operated within a predetermined time from the time at which the father 11 came home was operated by the father 11. For example, in the case where lighting A in a room 13 was turned on at 20:01 and the lighting A in the room 13 was turned off at 20:05, the operator estimation system estimates that the lighting A was operated by the father 11, and stores information for identifying the father 11 and weighting information in association with information indicating that the lighting A was operated. In the case where the volume of television B in a living room 14 was increased at 20:10, it is not determined that the television B was operated by the father 11 because the operation was performed after the predetermined time has passed since the time at which the father 11 came home.

Figure 2:
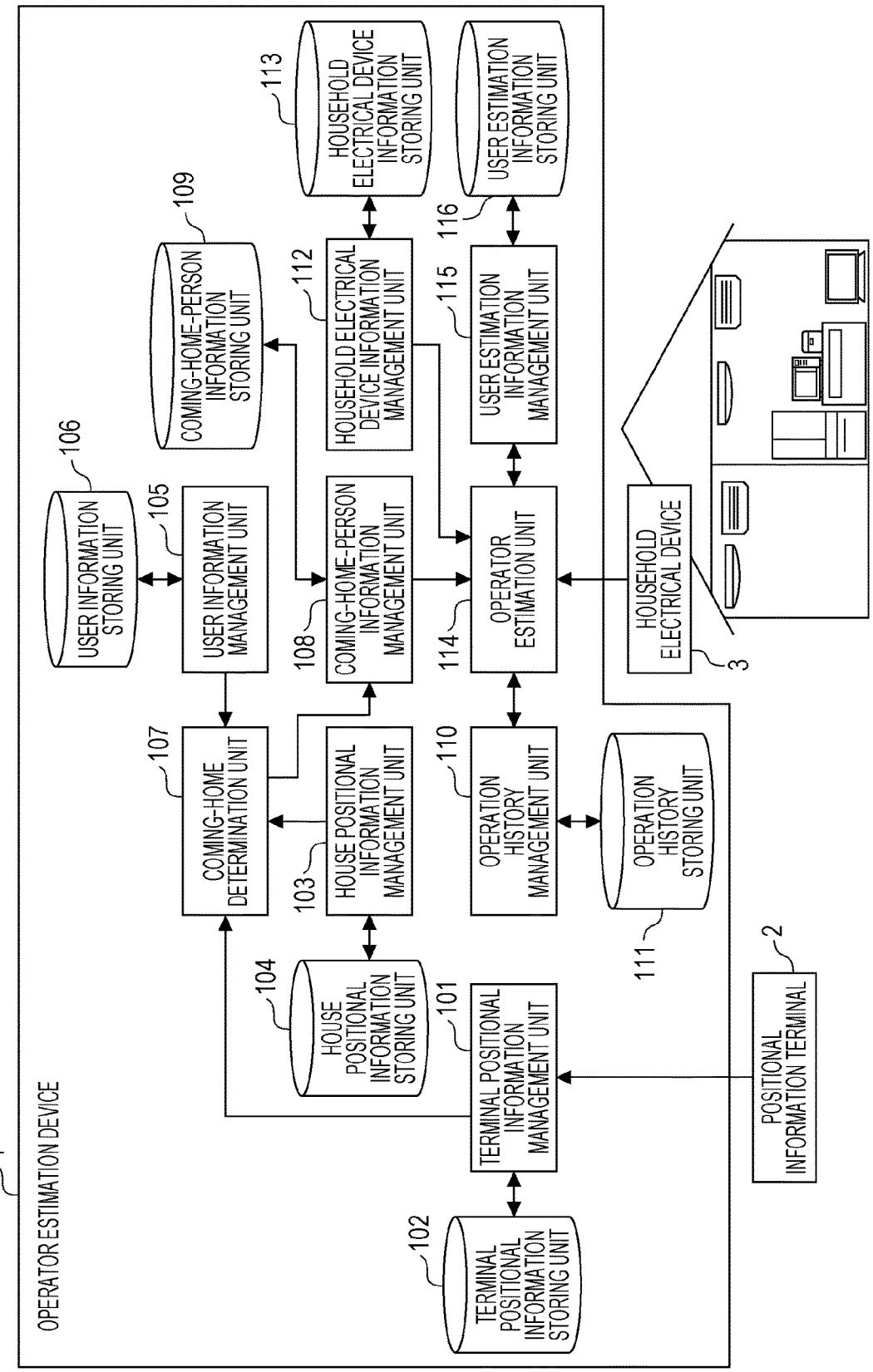
FIG. 2 is a diagram illustrating a configuration of the operator estimation system according to the first embodiment of the present disclosure.

FIG. 2 is a diagram illustrating the configuration of the operator estimation system according to the first embodiment of the present disclosure. The operator estimation system includes an operator estimation device 1, a positional information terminal 2, and a household electrical device 3.

The operator estimation device 1 is, for example, a server, and estimates operators of two or more electrical devices installed inside a building. A building is a house where an operator resides, and an electrical device is a household electrical device.

The positional information terminal 2 is, for example, a smartphone or a wearable device, and is carried or worn by a user. The positional information terminal 2 obtains the current position by, for example, a global positioning system (GPS). The positional information terminal 2 transmits the obtained current position and a positional information terminal ID for identifying the positional information terminal 2 to the operator estimation device 1. The positional information terminal 2 is connected to the operator estimation device 1 via a network so as to be able to communicate with the operator estimation device 1. The network is, for example, the Internet.

The household electrical device 3 is, for example, a lighting device, an air-conditioning device, or a television set, and is installed inside a building. When the household electrical device 3 is operated by a user, the household electrical device 3 transmits a household electrical device ID for identifying the household electrical device and device operation information indicating the details of the operation on the household electrical device to the operator estimation device 1. The household electrical device 3 is connected to the operator estimation device 1 via a network so as to be able to communicate with the operator estimation device 1.

The network is, for example, the Internet. The operator estimation system includes two or more household electrical devices 3.

The operator estimation device 1 includes a terminal positional information management unit 101, a terminal positional information storing unit 102, a house positional information management unit 103, a house positional information storing unit 104, a user information management unit 105, a user information storing unit 106, a coming-home determination unit 107, a coming-home-person information management unit 108, a coming-home-person information storing unit 109, an operation history management unit 110, an operation history storing unit 111, a household electrical device information management unit 112, a household electrical device information storing unit 113, an operator estimation unit 114, a user estimation information management unit 115, and a user estimation information storing unit 116.

The terminal positional information management unit 101 obtains the current position and a positional information terminal ID transmitted from the positional information terminal 2, and stores the obtained current position and positional information terminal ID in the terminal positional information storing unit 102. The positional information terminal 2 periodically transmits the current position and the positional information terminal ID to the operator estimation device 1. A communication unit, which is not illustrated in FIG. 2, receives the current position and the positional information terminal ID from the positional information terminal 2, and outputs the received current position and positional information terminal ID to the terminal positional information management unit 101.

The current position and the positional information terminal ID are automatically transmitted with predetermined time intervals from the positional information terminal 2 carried or worn by a user. Furthermore, in transmission of the current position by the positional information terminal 2, the predetermined time intervals with which the positional information terminal 2 transmits the current position may be changed in accordance with the distance between a house and the positional information terminal 2, which is calculated based on house positional information and the current position. For example, in the case where the distance between the house and the positional information terminal 2 is 5 km or more, the current position and the positional information terminal ID may be transmitted to the operator estimation device 1 every five minutes. In the case where the distance between the house and the positional information terminal 2 is equal to or longer than 1 km and shorter than or equal to 5 km, the current position and the positional information terminal ID may be transmitted to the operator estimation device 1 every one minute. In the case where the distance between the house and the positional information terminal 2 is equal to or longer than 100 m and shorter than or equal to 1 km, the current position and the positional information terminal ID may be transmitted to the operator estimation device 1 every ten seconds. In the case where the distance between the house and the positional information terminal 2 is shorter than 100 m, the current position and the positional information terminal ID may be transmitted to the operator estimation device 1 every one second. Accordingly, the power consumption of the positional information terminal 2 may be reduced.

The terminal positional information storing unit 102 stores terminal positional information in which the positional information terminal ID and the current position of the positional information terminal 2 are associated with each other.

FIG. 3 is a diagram illustrating an example of terminal positional information stored in a positional information storing unit. As illustrated in FIG. 3, the terminal positional information storing unit 102 stores terminal positional information in which the positional information terminal ID and the current position of the positional information terminal 2 are associated with each other. The current position is represented by, for example, latitude and longitude. For example, the current position "xxx" is associated with the positional information terminal ID "mobile-a".

The current position of the positional information terminal 2 is not used to identify the position of a user inside a building but is used to determine whether or not the user has entered the building, that is, whether or not the user has come home.

The house positional information management unit 103 obtains the positional information terminal ID and the house position, and stores the obtained positional information terminal ID and the house position in the house positional information storing unit 104. The positional information terminal ID and the house position are, for example, input by the positional information terminal 2 or a personal computer at the time of initial setting. Furthermore, the positional information terminal ID and the house position may be estimated based on the current position and the positional information terminal ID transmitted from the positional information terminal 2 in the nighttime.

The house positional information storing unit 104 stores house positional information in which the positional information terminal ID and the house position are associated with each other. The house position is represented by, for example, latitude and longitude. The house position represents the position of the house where the user who carries the positional information terminal 2 resides. The house positional information storing unit 104 stores house positional information in which positional information terminal IDs of multiple users who reside in the same house and the house position are associated with each other.

The user information management unit 105 obtains the positional information terminal ID and a family member ID, and stores the obtained positional information terminal ID and the family member ID in the user information storing unit 106. The family member ID is information for identifying which member of the family owns the positional information terminal 2.

The user information storing unit 106 stores user information in which the positional information terminal ID and the family member ID are associated with each other.

FIG. 4 is a diagram illustrating an example of user information stored in a user information storing unit. As illustrated in FIG. 4, the user information storing unit 106 stores, for each of one or more users as estimation targets, user information in which a positional information terminal ID and a family member ID are associated with each other. For example, a family member ID "a (father)" is associated with a positional information terminal ID "mobile-a", a family member ID "b (mother)" is associated with a positional information terminal ID "mobile-b", and a family member ID "c (child)" is associated with a positional information terminal ID "mobile-c".

The coming-home determination unit 107 determines, based on positional information of a building and current positional information transmitted from the positional information terminal 2 carried or worn by a user, whether or not the user has entered the building. That is, the coming-home determination unit 107 obtains a positional information terminal ID and the current position from the terminal positional information management unit 101, and obtains a house position corresponding to the obtained positional information terminal ID from the house positional information management unit 103. The coming-home determination unit 107 determines, based on the house position obtained from the house positional information management unit 103 and the current position obtained from the terminal positional information management unit 101, whether or not the user has come home. In the case where the house position obtained from the house positional information management unit 103 and the current position obtained from the terminal positional information management unit 101 are the same, the coming-home determination unit 107 determines that the user has come home. In the case where the current position obtained from the terminal positional information management unit 101 falls within a circle with a predetermined radius centered at the house position obtained from the house positional information management unit 103, the coming-home determination unit 107 may determine that the user has come home.

Furthermore, in determination of whether or not a user has entered a building, the coming-home determination unit 107 refers to, for each of one or more users as estimation targets, user information in which user identification information (family member ID) for identifying the user and user terminal identification information (positional information terminal ID) for identifying a user terminal are associated with each other, and identifies which one of the one or more users as estimation targets has entered the building. That is, in the case where it is determined that a user has entered a building, the coming-home determination unit 107 obtains a family member ID which is associated with the positional information terminal ID of the user who has entered the building from the user information management unit 105.

The coming-home-person information management unit 108 stores the family member ID identified by the coming-home determination unit 107 and an elapsed time from the time at which the user corresponding to the family member ID came home to the current time in the coming-home-person information storing unit 109.

The coming-home-person information storing unit 109 stores coming-home-person information in which a family member ID of a user who has come home and the elapsed time from the time at which the user came home are associated with each other.

FIG. 5 is a diagram illustrating an example of coming-home-person information stored in a coming-home-person information storing unit. As illustrated in FIG. 5, the coming-home-person information storing unit 109 stores, for each of one or more users as estimation targets, coming-home-person information in which a family member ID and the elapsed time are associated with each other. For example, the elapsed time "180" (seconds) is associated with the family member ID "a (father)".

The operator estimation unit 114 obtains device operation information transmitted from the household electrical device 3, and outputs the obtained device operation information to the operation history management unit 110. A communication unit, which is not illustrated in FIG. 2, receives device operation information from the household electrical device 3, and outputs the received device operation information to the operator estimation unit 114. The device operation information includes a household electrical device ID (device identification information) for identifying a household electrical device on which an operation was performed, an operation time at which the operation was performed, and information for identifying the operation.

In the case where it is determined that a user has entered a building, the operator estimation unit 114 estimates, based on operation histories obtained by storing, for each operation, device operation information in which a household electrical device ID (device identification information) for identifying a household electrical device on which an operation was performed, an operation time at which the operation was performed, and information for identifying the operation are associated with one another and the time at which the user entered the building, the operation performed by the user. The operator estimation unit 114 adds operator information indicating that the estimated operation was performed by the user to the device operation information corresponding to the estimated operation. The operator information includes a family member ID (user identification information) for identifying a user and weighting information indicating the probability that the user is the actual operator as a numerical value.

The operator estimation unit 114 estimates that an operation corresponding to device operation information within a period from the time at which a user entered a building until a predetermined time has passed is an operation performed by the user. For example, the operator estimation unit 114 estimates that an operation performed within ten minutes from the time at which the user entered a building is an operation performed by the user who entered the building.

The operation history management unit 110 obtains device operation information output from the operator estimation unit 114, and stores the obtained device operation information in the operation history storing unit 111.

The operation history storing unit 111 stores operation histories obtained by storing, for each operation, device operation information in which a household electrical device ID (device identification information) for identifying a household electrical device on which an operation was performed, an operation time at which the operation was performed, and information for identifying the operation are associated with one another.

FIG. 6 is a diagram illustrating an example of operation histories stored in an operation history storing unit. As illustrated in FIG. 6, an operation history includes device operation information and operator information. Device operation information includes an operation time at which an operation was performed, a household electrical device ID for identifying a household electrical device on which an operation was performed, and information (details of operation) for identifying the operation. In FIG. 6, device operation information indicates that an operation for switching on a household electrical device having a household electrical device ID "device A" was performed at 20:01, device operation information indicates that an operation for switching off a household electrical device having a household electrical device ID "device-A" was performed at 20:05, and device operation information indicates that an operation for increasing the volume of a household electrical device having a household electrical device ID "device-B" was performed at 20:10.

Furthermore, operator information includes a family member ID and weighting information. For example, in the case where a user with a family member ID "a (father)" came home at 20:00, operator information including the family member ID "a (father)" and weighting information "+10" is associated with an operation performed at 20:01. Furthermore, operator information including the family member ID "a (father)" and weighting information "+5" is associated with an operation performed at 20:05. Operation information is not associated with an operation performed at 20:10 because 10 minutes have passed since the time at which the user came home.

Weighting information is a value which decreases in accordance with an elapsed time from the time at which a user entered a building. For example, in the case where the elapsed time from the time at which a user came home is managed in units of seconds, the elapsed time in units of seconds may be converted into an elapsed time in units of minutes, and the reciprocal of the converted elapsed time in units of minutes may be calculated as weighting information. That is, weighting information 1/(60/60)=1.0 is added to a household electrical device operated one minute after a user came home, and weighting information 1/(300/60)=0.2 is added to a household electrical device operated five minutes after a user came home.

Furthermore, weighting information may be a constant value at any time. For example, weighting information +5 may be added to a household electrical device operated within ten minutes from the time at which a user entered a building.

The household electrical device information management unit 112 obtains a household electrical device ID, the name of the household electrical device, and a family member ID of a user who uses the household electrical device, and stores the obtained household electrical device ID, the name of the household electrical device, and the family member ID in the household electrical device information storing unit 113. The household electrical device ID, the name of the household electrical device, and the family member ID are input, for example, to the positional information terminal 2 or a personal computer at the time of initial setting.

The household electrical device information storing unit 113 stores household electrical device information in which a household electrical device ID, the name of the household electrical device, and a family member ID of a user who uses the household electrical device are associated with one another.

FIG. 7 is a diagram illustrating an example of household electrical device information stored in a household electrical device information storing unit. As illustrated in FIG. 7, the household electrical device information storing unit 113 stores household electrical device information in which a household electrical device ID, the name of the household electrical device, and a family member ID are associated with one another. For example, a name "household electrical device A" and family member IDs "a (father), b (mother), and c (child)" are associated with a household electrical device ID "device-A". In this case, the name of the household electrical device represented by the household electrical device ID "device-A" is "household electrical device A" and the household electrical device is used by users represented by the family member IDs "a (father), b (mother), and c (child)".

The operator estimation unit 114 calculates, based on an operation history including operator information added thereto, user estimation information indicating the rate at which an electrical device is used by each of two or more users. The operator estimation unit 114 calculates user estimation information by calculating, for each of two or more users, weighting information added to device operation information within a predetermined period of an operation history including operator information added thereto. The predetermined period may be the whole period during which operation histories are recorded or may be a period a predetermined time before the current time.

The user estimation information management unit 115 stores the user estimation information calculated by the operator estimation unit 114 in the user estimation information storing unit 116.

The user estimation information storing unit 116 stores user estimation information in which a household electrical device ID for identifying a household electrical device and the total sum of weighting information of each of two or more users in the family for the household electrical device are associated with each other.

FIG. 8 is a diagram illustrating an example of user estimation information stored in a user estimation information storing unit. As illustrated in FIG. 8, the user estimation information storing unit 116 stores user estimation information in which a household electrical device ID and the total sum of weighting information provided according to the use of the household electrical device are associated with individual users in the family.

For example, for a household electrical device ID "device-A", the total sum of weighting information of a family member ID "a (father)" is "22.5", the total sum of weighting information of a family member ID "b (mother)" is "2.5", and the total sum of weighting information of a family member ID "c (child)" is "0". Furthermore, for a household electrical device ID "device-B", the total sum of weighting information of the family member ID "a (father)" is "22.5, the total sum of weighting information of a family member ID "b (mother)" is "2.5", and the total sum of weighting information of a family member ID "c (child)" is "0". Furthermore, for a household electrical device ID "device-C", the total sum of weighting information of the family member ID "a (father)" is "20.0, the total sum of weighting information of a family member ID "b (mother)" is "25.0", and the total sum of weighting information of a family member ID "c (child)" is "10.0".

In the first embodiment, the coming-home determination unit 107 corresponds to an example of a determination unit, and the operator estimation unit 114 corresponds to an example of an estimation unit and an update unit.

Next, an operation of the operator estimation system according to the first embodiment will be described.

Figure 10:
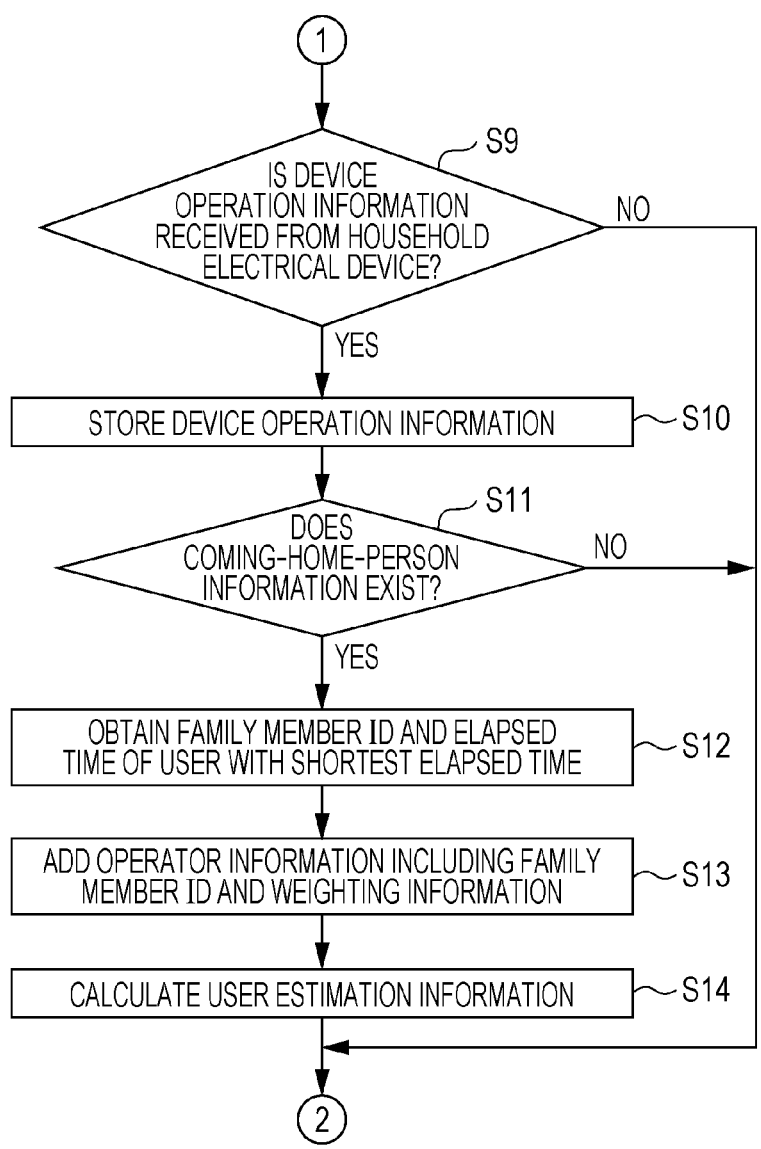
FIG. 10 is a second flowchart for explaining the operation of the operator estimation system according to the first embodiment.

FIG. 9 is a first flowchart for explaining an operation of an operator estimation system according to the first embodiment, and FIG. 10 is a second flowchart for explaining an operation of the operator estimation system according to the first embodiment.

First, in step S1, the coming-home-person information management unit 108 determines whether or not coming-home-person information with an elapsed time exceeding a predetermined time exists in the coming-home-person information storing unit 109. The predetermined time is, for example, ten minutes. In the case where it is determined that coming-home-person information with an elapsed time exceeding the predetermined time does not exist in the coming-home-person information storing unit 109 (NO in step S1), the process proceeds to step S3.

In the case where it is determined that coming-home-person information with an elapsed time exceeding the predetermined time exists in the coming-home-person information storing unit 109 (YES in step S1), the coming-home-person information management unit 108 deletes the coming-home-person information with the elapsed time exceeding the predetermined time from the coming-home-person information storing unit 109.

Next, in step S3, the coming-home determination unit 107 determines whether or not a user has come home. In this processing, the coming-home determination unit 107 obtains a positional information terminal ID and the current position from the terminal positional information management unit 101, and obtains a house position corresponding to the obtained positional information terminal ID from the house positional information management unit 103. In the case where the house position obtained from the house positional information management unit 103 and the current position obtained from the terminal positional information management unit 101 are the same, the coming-home determination unit 107 determines that the user has come home. As described above, in the case where the house position and the current position of the positional information terminal 2 are completely the same, the coming-home determination unit 107 may determine that the user has come home. Also, in the case where the distance between the house position and the current position of the positional information terminal 2 is less than or equal to a predetermined distance, the coming-home determination unit 107 may determine that the user has come home.

In the case where it is determined that the user has not come home (NO in step S3), the process proceeds to step S9.

In the case where it is determined that the user has come home (YES in step S3), the coming-home determination unit 107 identifies which one of one or more users as estimation targets has come home in step S4. That is, in the case where it is determined that a user has come home, the coming-home determination unit 107 identifies who is the user who has come home by obtaining a family member ID associated with the positional information terminal ID of the user who has come home from the user information management unit 105.

Next, in step S5, the coming-home-person information management unit 108 determines whether or not coming-home-person information corresponding to the user who has come home exists in the coming-home-person information storing unit 109. That is, the coming-home-person information management unit 108 determines whether or not coming-home-person information corresponding to the family member ID of the user identified by the coming-home determination unit 107 exists in the coming-home-person information storing unit 109. In the case where it is determined that the coming-home-person information corresponding to the user who has come home exists in the coming-home-person information storing unit 109 (YES in step S5), the process proceeds to step S9.

In the case where it is determined that the coming-home-person information corresponding to the user who has come home does not exist in the coming-home-person information storing unit 109 (NO in step S5), the coming-home-person information management unit 108 adds the coming-home-person information corresponding to the user who has come home into the coming-home-person information storing unit 109 in step S6. That is, the coming-home-person information management unit 108 stores the coming-home-person information including the family member ID of the user identified by the coming-home determination unit 107 in the coming-home-person information storing unit 109.

Next, in step S7, the coming-home-person information management unit 108 initializes the elapsed time of the added coming-home-person information.

In the first embodiment, in the case where it is determined in step S5 that the coming-home-person information corresponding to the user who has come home exists in the coming-home-person information storing unit 109, the process proceeds to step S9. However, the present disclosure is not particularly limited to this. In the case where it is determined in step S5 that the coming-home-person information corresponding to the user who has come home exists in the coming-home-person information storing unit 109, the process may proceed to step S7, and the coming-home-person information management unit 108 may initialize the elapsed time of the coming-home-person information. Accordingly, in the case where the user who has come home goes out and comes home again within a predetermined time, the elapsed time of the coming-home-person information may be reset.

In step S8, the coming-home-person information management unit 108 starts measuring the elapsed time of the added coming-home-person information.

In step S9, the operator estimation unit 114 determines whether or not device operation information is received from the household electrical device 3. The household electrical device 3 periodically transmits device operation information to the operator estimation device 1. In the case where it is determined that device operation information is not received from the household electrical device 3 (NO in step S9), the process returns to step S1.

In the case where it is determined that device operation information is received from the household electrical device 3 (YES in step S9), the operation history management unit 110 stores the device operation information output from the operator estimation unit 114 in the operation history storing unit 111 in step S10.

In step S11, the operator estimation unit 114 determines whether or not coming-home-person information exists in the coming-home-person information storing unit 109. In the case where it is determined that coming-home-person information does not exist in the coming-home-person information storing unit 109 (NO in step S11), the process returns to step S1.

In the case where it is determined that coming-home-person information exists in the coming-home-person information storing unit 109 (YES in step S11), the operator estimation unit 114 obtains a family member ID and an elapsed time of a user with the shortest elapsed time from coming-home-person information stored in the coming-home-person information storing unit 109 in step S12.

In step S13, the operator estimation unit 114 determines weighting information corresponding to the obtained elapsed time, and adds operator information including the obtained family member ID and determined weighting information to the device operation information.

In step S14, the operator estimation unit 114 calculates user estimation information by calculating, for each of two or more users, weighting information added to device operation information within a predetermined period from operation histories including operator information added thereto. The operator estimation unit 114 may update user estimation information by adding only currently determined weighting information to user estimation information in the user estimation information storing unit 116.

As described above, the household electrical device 3 periodically transmits device operation information to the operator estimation device 1, and the positional information terminal 2 periodically transmits the current position to the operator estimation device 1. Therefore, the operator estimation device 1 may obtain weighting information for estimating a main user of a household electrical device without requiring the user to perform a special operation. That is, the user does not need to operate the household electrical device 3 via the positional information terminal 2 such as a smartphone, and only needs to operate the household electrical device 3 using a button provided at the main body of the household electrical device 3 or a remote controller attached to the household electrical device 3, and the operator estimation device 1 may thus obtain weighting information for estimating a main user of the household electrical device.

Furthermore, weighting information is added, as operator information indicating that an estimated operation has been performed by a user, to device operation information corresponding to the estimated operation. Therefore, learning of settings for a household electrical device to realize a comfortable space for each family member may be achieved using operation histories including weighting information added thereto.

The coming-home determination unit 107 may determine whether or not two or more users entered a building within a predetermined period. In the case where it is determined that two or more users entered a building within the predetermined period, the operator estimation unit 114 may not estimate an operation performed by a user. That is, in the case where two or more users came home at the same time, it is difficult to identify who performed an operation for a household electrical device, which was performed after the two or more users came home. Thus, in the case where two or more users came home within a predetermined period, the operator estimation unit 114 may not estimate an operation performed by a user.

Furthermore, the coming-home determination unit 107 may determine, based on the current position transmitted from each family member, whether or not only one member is present at home. The operator estimation unit 114 may estimate that an operation performed within a period during which only one member is present at home is an operation performed by the one member.

Furthermore, the operator estimation system may further include a display device connected to the operator estimation device 1 so as to be able to communicate with the operator estimation device 1. The display device transmits a display information request for requesting for display information for displaying user estimation information to the operator estimation device 1. The display device is, for example, a smartphone, a television set, or a personal computer. The display device may be the same terminal as the positional information terminal 2 or may be a terminal different from the positional information terminal 2. The operator estimation device 1 may further include a communication unit which receives a display information request from the display device and transmits display information to the display device and a display information creation unit which creates display information for displaying user estimation information on the display device. In the case where a display information request from the display device is received by the communication unit, the display information creation unit creates display information. The display device receives display information transmitted from the operator estimation device 1, and displays the received display information.

Figure 11:
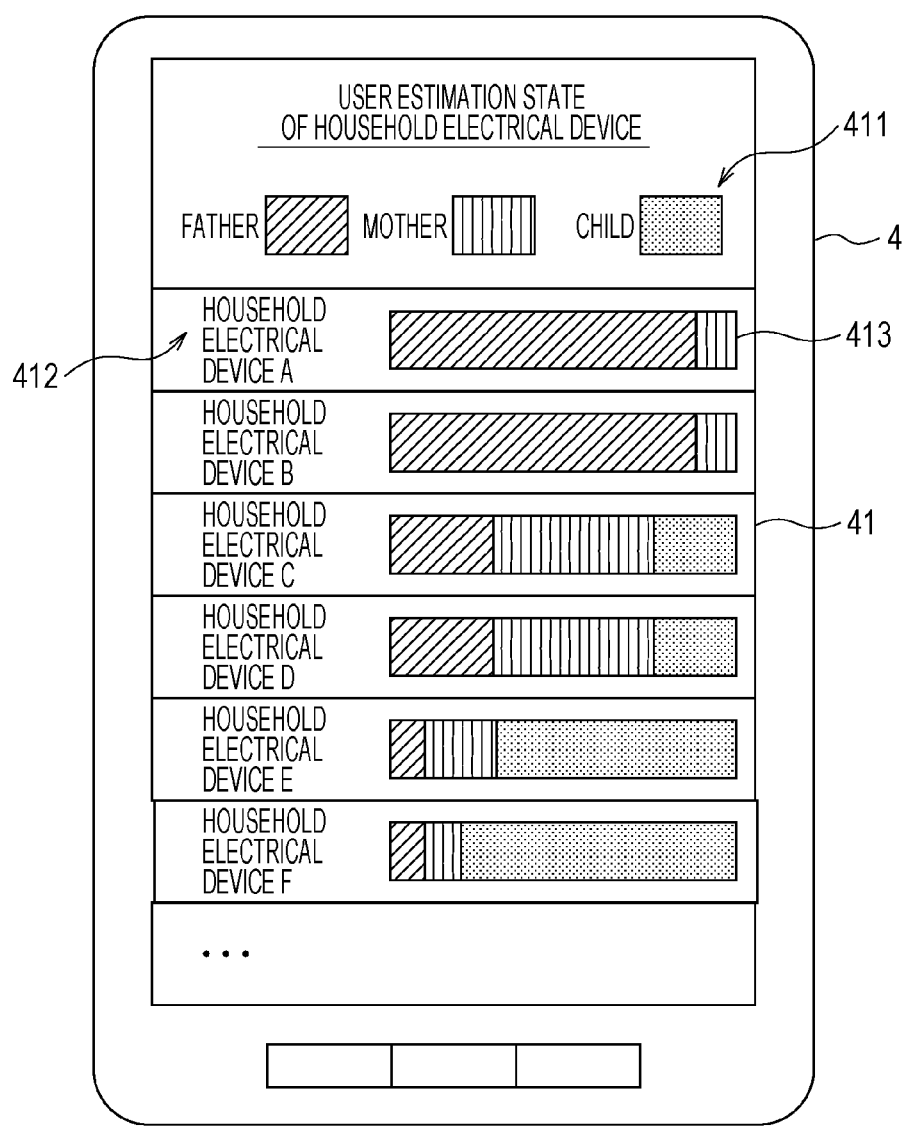
FIG. 11 is a diagram illustrating an example of display information displayed on a display device.

FIG. 11 is a diagram illustrating an example of display information displayed on the display device. The display information creation unit calculates, based on weighting information of family members associated with each household electrical device ID in user estimation information, the use ratio of the household electrical device for each family member, and creates display information indicating, for each household electrical device, the calculated use ratio for each family member by a bar graph.

As illustrated in FIG. 11, a display device 4 displays received display information 41. The display information 41 includes a family member name 411 representing the name of a family member, a household electrical device name 412 representing the name of a household electrical device, and a bar graph 413 representing the use ratio for the household electrical device by the family member.

For example, in the user estimation information illustrated in FIG. 8, for the household electrical device ID "device-A", the use ratio of the family member ID "a (father)" is 22.5/(22.5+2.5+0)=0.9, the use ratio of the family member ID "b (mother)" is 2.5/(22.5+2.5+0)=0.1, and the use ratio of the family member ID "c (child)" is 0/(22.5+2.5+0)=0.

In the case where the name of a household electrical device corresponding to the household electrical device ID "device-A" is "household electrical device A", the bar graph 413 indicating the use ratio of the "household electrical device A" is represented by dividing the length between left and right ends of the bar graph 413 according to the use ratio of each family member, as illustrated in FIG. 11. The household electrical device name 412 is identified by referring to household electrical device information managed by the household electrical device information management unit 112.

Furthermore, in the first embodiment, all the family members carry their own positional information terminals 2. However, the present disclosure is not limited to this. One of the family members may not carry the positional information terminal 2 and all the other family members may carry the positional information terminal 2.

In this case, user information may further include terminal non-possessing user identification information for identifying a terminal non-possessing user who is an estimation target and who does not carry or wear the positional information terminal 2. The operator estimation unit 114 may estimate that an operation corresponding to device operation information with an operation time within a period during which a user who is defined as an estimation target and who carries or wears the positional information terminal 2 is not present inside a building is an operation performed by a terminal non-possessing user identified based on terminal non-possessing user identification information. The operator estimation unit 114 may add to device operation information corresponding to an estimated operation operator information indicating that the estimated operation has been performed by a terminal non-possessing user.

In the case where only one terminal non-possessing user who does not carry or wear the positional information terminal 2 exists among family members, it is determined that the other users who carry or wear their own positional information terminals 2 are out, and device operation information is received from a household electrical device, it may be determined that the device operation information is transmitted from the household electrical device operated by the terminal non-possessing user.

Furthermore, in the case where a user has entered a building, the operator estimation unit 114 may identify, based on user estimation information, a household electrical device for which the ratio of use by the user who has entered the building is predetermined value or more. The operator estimation unit 114 may add operator information to device operation information for which the operation time is a time after a predetermined time has passed since the time at which the user entered the building and device identification information matches device identification information of the household electrical device identified by the device identification information.

Furthermore, by managing an operation history and user estimation information in association with each other, the current position of a user inside a house or movement of the user may be estimated based on device operation information received from the household electrical device inside the house.

For example, in the case where the power of the household electrical device B with low weighting information for the user A is turned on after the power of the household electrical device A with high weighting information for the user A is turned off, the operator estimation system may estimate that the user A has moved from a room in which the household electrical device A is arranged to a room in which the household electrical device B is arranged, and may automatically operate the household electrical device B with an operation state comfortable for the user A. The operation state comfortable for the user A may be set in advance by the user A or a state of an operation performed for the household electrical device B by the user A in the past may be obtained from operation histories.

Furthermore, an operation state may be obtained from an operation history of the household electrical device A with high weighting information for the user A, and the household electrical device B may be operated in the same operation state as the obtained operation state. For example, in the case where the user A sets the temperature of the household electrical device A (air-conditioning device) installed in his/her own room to 24 degrees C., for usage of the household electrical device B (air-conditioning device) installed in a different room by the user A, the operation state of the household electrical device B is set to 24 degrees C., which is the same setting as usual setting for the household electrical device A by the user A. In this case, it is assumed that the household electrical device A and the household electrical device B are household electrical devices of the same type. However, even in the case where the user A uses the household electrical device B, which is not usually used by the user A or which is new to the user A, the household electrical device B may be operated in the operation state optimal for the user A.

Second Embodiment

Next, an operator estimation system according to a second embodiment will be described. In the first embodiment described above, in the case where a user has come home, the user who has come home is identified, and it is determined that a household electrical device operated within a predetermined time from the time at which the user came home was operated by the identified user. In contrast, in the second embodiment, in the case where a user who mainly uses a first household electrical device is identified, it may be estimated that a second household electrical device operated within a predetermined time from the time at which the first household electrical device was operated was also performed by the user who mainly uses the first household electrical device.

Figure 12:
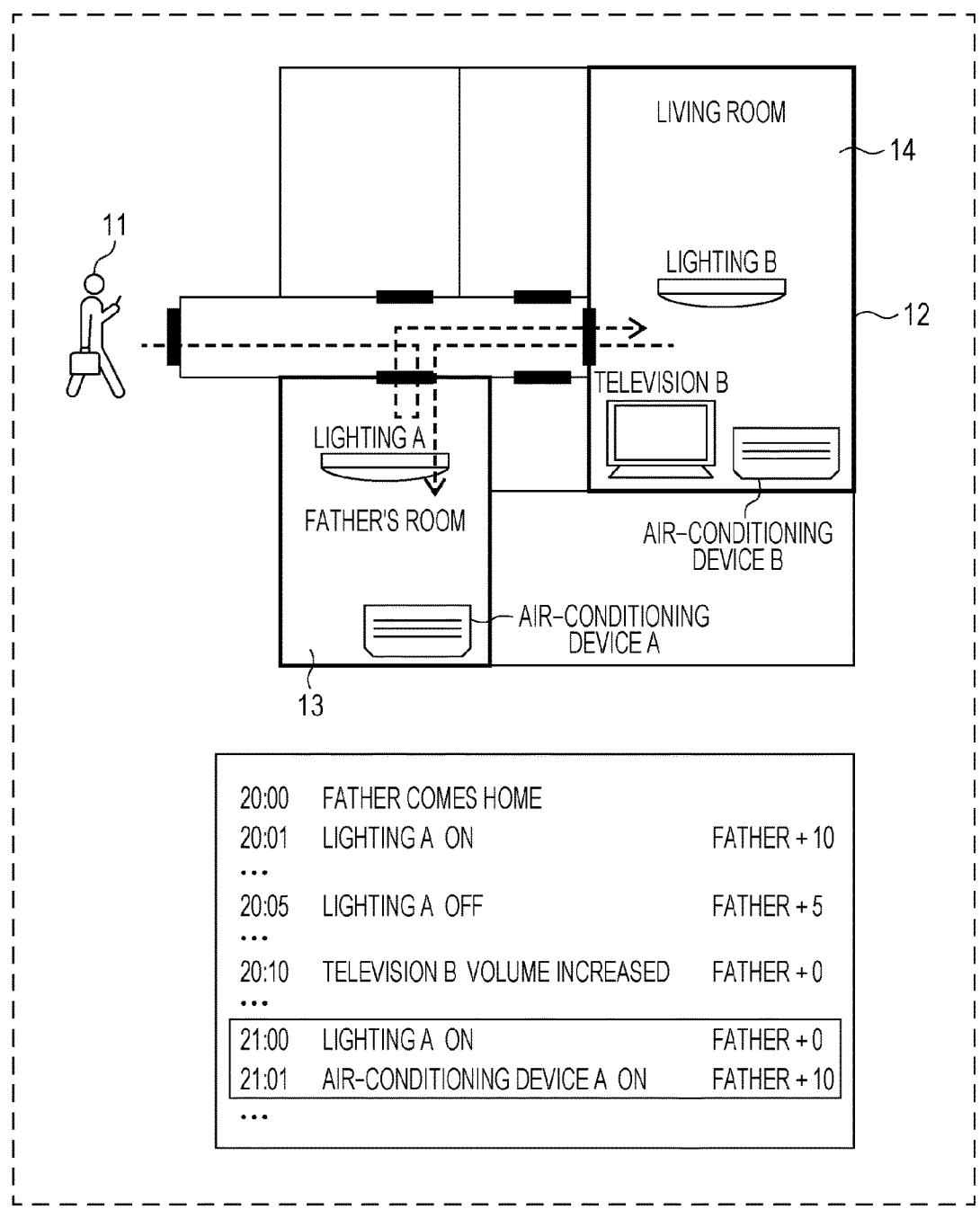
FIG. 12 is a schematic diagram for explaining an overview of an operator estimation system according to a second embodiment of the present disclosure.

FIG. 12 is a schematic diagram for explaining an overview of an operator estimation system according to the second embodiment of the present disclosure.

For example, the father 11, who is a member of a family, carries a positional information terminal which automatically transmits current positional information with predetermined time intervals. In the case where the father 11 came home 12 at 20:00, the operator estimation system identifies, based on current positional information transmitted from the positional information terminal, that the person who came home is the father 11. Then, it is determined that a household electrical device operated within a predetermined time from the time at which the father 11 came home was operated by the father 11. For example, in the case where the lighting A in the room 13 was turned on at 20:01 and the lighting A in the room 13 was turned off at 20:05, the operator estimation system estimates that the lighting A was operated by the father 11, and stores information for identifying the father 11 and weighting information in association with information indicating that the lighting A was operated. In the case where the volume of the television B in the living room 14 was increased at 20:10, it is not determined that the television B was operated by the father 11 because the operation was performed after the predetermined time has passed since the time at which the father 11 came home.

Furthermore, in the case where the lighting A in the room 13 was turned on at 21:00 and the power of the air-conditioning device A in the room 13 was turned on at 21:01, although the air-conditioning device A was operated after the predetermined time has passed since the time at which the father came home, the household electrical device that was operated immediately before the air-conditioning device A was operated is the lighting A and the user who mainly uses the lighting A is identified as the father 11. In this case, it may also be estimated that the air-conditioning device A operated within the predetermined time from the time at which the lighting A was operated was operated by the father 11 who mainly uses the lighting A. The operator estimation system estimates that the air-conditioning device A was operated by the father 11, and stores information for identifying the father 11 and weighting information in association with information indicating the air-conditioning device A was operated.

The configuration of the operator estimation system according to the second embodiment will be described with reference to the operator estimation system according to the first embodiment illustrated in FIG. 2.

The operator estimation unit 114 estimates, based on user estimation information, that an operator of an electric device for which the ratio of use by one of two or more users is a predetermined value or more is the one user.

The operator estimation unit 114 adds operator information indicating that an operation was performed by a user to device operation information stored within a predetermined period from the time at which device operation information including device identification information of the household electrical device for which an operator was estimated in operation histories.

Next, an operation of the operator estimation system according to the second embodiment will be described.

Figure 13:
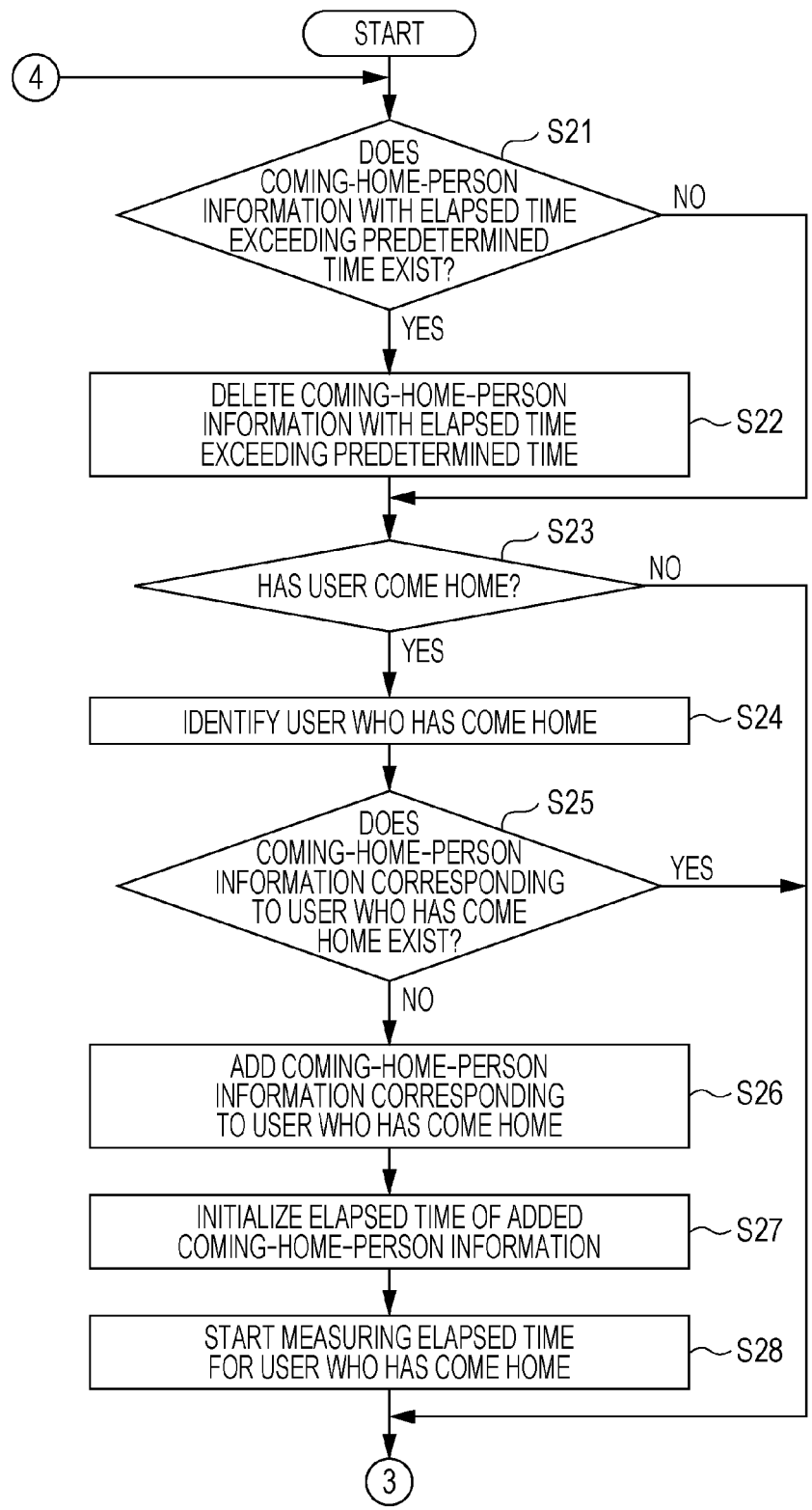
FIG. 13 is a first flowchart for explaining an operation of an operator estimation system according to the second embodiment.
Figure 14:
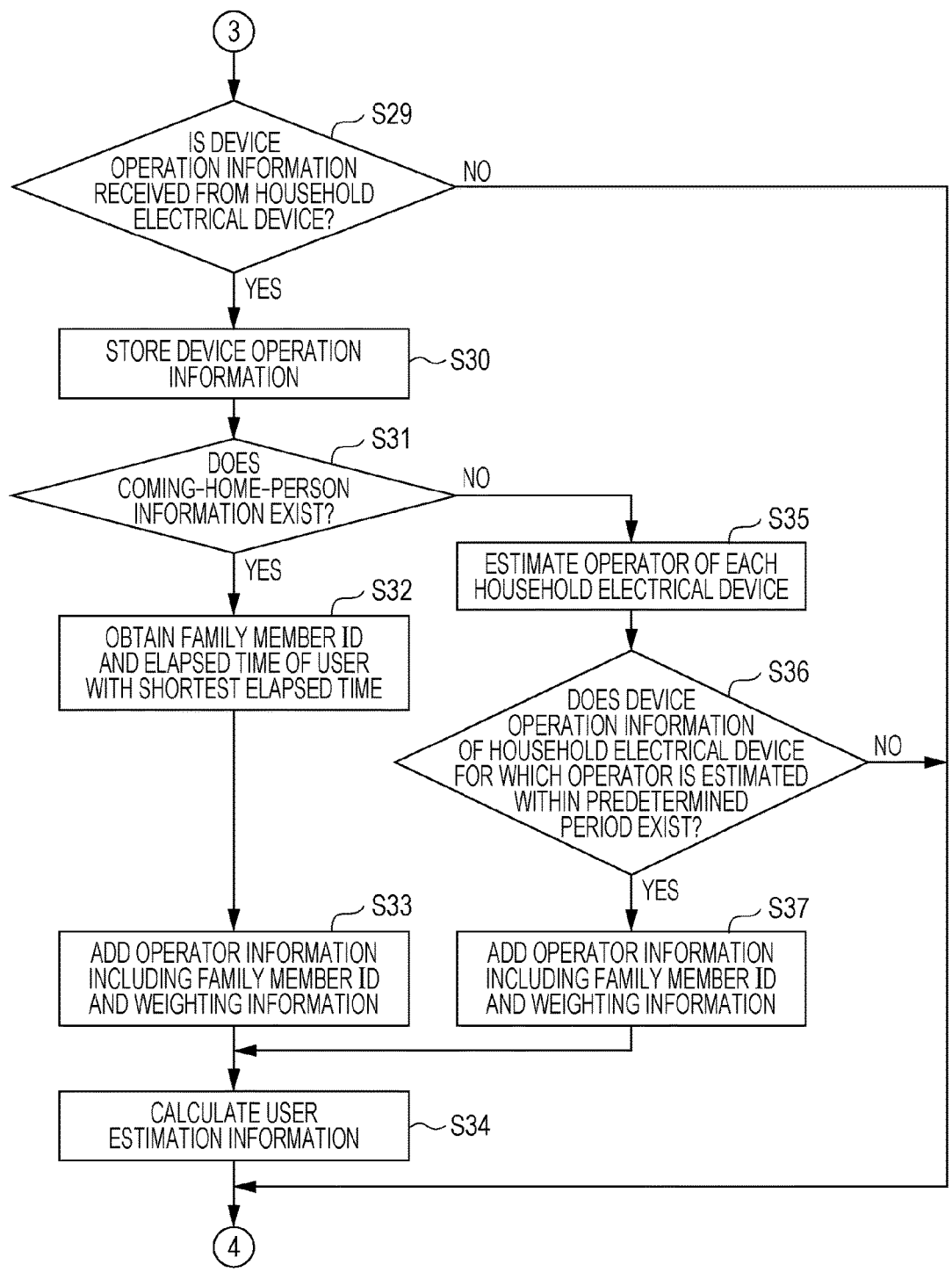
FIG. 14 is a second flowchart for explaining the operation of the operator estimation system according to the second embodiment.

FIG. 13 is a first flowchart for explaining the operation of the operator estimation system according to the second embodiment, and FIG. 14 is a second flowchart for explaining the operation of the operator estimation system according to the second embodiment.

Processing of steps S21 to S34 in FIGS. 13 and 14 is the same as processing of steps S1 to S14 in FIGS. 9 and 10, and therefore, explanation for the processing of steps S21 to S34 will be omitted.

In the case where it is determined in step S31 that coming-home-person information does not exist in the coming-home-person information storing unit 109 (NO in step S31), the operator estimation unit 114 estimates, for each household electrical device arranged inside a building, based on user estimation information, an operator of the household electrical device for which the ratio of use by one of two or more users is a predetermined value or more is the one user in step S35. That is, the operator estimation unit 114 calculates, based on weighting information of a family member associated with each household electrical device ID in user estimation information, the use ratio of the household electrical device for each family member, and estimates that a member with a use ratio of, for example, 50% or more is an operator of the household electrical device. The method for calculating the use ratio is the same as the calculation method described in the first embodiment.

Next, in step S36, the operator estimation unit 114 determines, by referring to operation histories, whether or not device operation information of the household electrical device for which an operator was estimated within a predetermined period before the time at which the device operation information was received exists. In the case where it is determined that device operation information of a household electrical device for which the operator was estimated within the predetermined period does not exist (NO in step S36), the process returns to step S21.

In contrast, in the case where it is determined that device operation information of a household electrical device for which the operation was estimated within the predetermined period exists (YES in step S36), the operator estimation unit 114 determines weighting information corresponding to the elapsed time from the time at which the device operation information of the household electrical device for which the operator was estimated was received to the time at which the current device operation information was received, and adds operator information including the family member ID and the determined weighting information of the estimated operator to the device operation information in step S37.

In each of the foregoing embodiments, each component may be implemented by dedicated hardware or a software program suitable for the component. An operation or function of each component may be implemented when a program execution unit such as a central processing unit (CPU) or a processor reads a software program recorded in a computer-readable recording medium such as a hard disk or a semiconductor memory and executes the read software program.

Data used for implementing an operation or function of each component may be recorded in a semiconductor or a writable recording medium such as a hard disk.

An operator estimation method, an operator estimation apparatus, and a non-transitory computer-readable recording medium storing an operator estimation program may easily estimate a user who uses an electrical device arranged inside a building most frequently and are useful as an operator estimation method, an operator estimation apparatus, and a non-transitory computer-readable recording medium storing an operator estimation program for estimating operators of two or more electrical devices installed inside a building.

What is claimed is:

1. A method for estimating an operator of multiple electrical devices, the multiple electrical devices being installed in a building, the method comprising:
   receiving, from each of the multiple electrical devices, an operation log indicating that a corresponding electrical device was operated, the operation log including i) an ID of the corresponding electrical device and ii) a time at which the corresponding electrical device was operated;
   receiving first positional information indicating a current position of a first terminal of a first user, the first terminal of the first user being carried or worn by the first user;
   determining, in a case where a distance between the current position indicated in the first positional information and a position of the building is a predetermined distance or less, that the first user entered the building from outside of the building; and
   estimating that the first user is an operator of a first electrical device based on the time at which the first electrical device was operated as recorded in a first operation log received from the first electrical device, when it is determined that the first user entered the building from outside of the building.

2. The method according to claim 1, further comprising:
   generating first operation information in which the first operation log is associated with a user ID of the first user.

3. The method according to claim 1, wherein
   the first operation log includes a first operation time at which an operation was performed at the first electric device, wherein the first operation time is within a predetermined period from the time at which the first positional information was received.

4. The method according to claim 1, further comprising:
   generating the first operation information in which weighting information is associated with the user ID of the first user,
   wherein the weighting information indicates a probability that the first user of the user ID is the operator of the first electrical device.

5. The method according to claim 4, wherein
   the weighting information is determined, based on i) the operation time indicated in the first operation log and ii) the time at which the first positional information was received, wherein the weighting information decreases as a difference between the operation time indicated in the first operation log and the time at which the first positional information was received increases.

6. The method according to claim 4, wherein the weighting information is constant, irrespective of the operation time indicated in the first operation log.

7. The method according to claim 4, further comprising:
   calculating an operation frequency of the first user for the first electric device, based on the weighting information.

8. The method according to claim 1, further comprising:
   storing, as history information, multiple pieces of operation information in which operation logs are associated with user IDs of multiple users; and
   calculating, based on the history information, an operation frequency of each of the multiple users for each of the multiple electrical devices.

9. The method according to claim 8, further comprising:
   generating user information in which i) each of corresponding users and ii) corresponding operation frequency are associated with iii) each of the multiple electrical devices.

10. The method according to claim 9, further comprising:
    displaying the user information on a display provided at the first terminal of the first user or a predetermined external terminal.

11. The method according to claim 8, wherein
    the operation frequency is calculated based on all the pieces of operation information included in the history information.

12. The method according to claim 8, further comprising:
    estimating, based on the calculation result, a second electrical device for which a frequency at which an operation is performed by a second user among the multiple users is equal to or more than a predetermined value.

13. The method according to claim 1, further comprising:
generating second operation information in which a second operation log is associated with an operation time within a period from a first time at which the last operation was performed at the first electronical device, to a second time before a predetermined time; and
calculating an operation frequency of the first user for the first electric device based on the second operation information.

14. The method according to claim 1, further comprising:
generating, in a case where an electrical device indicated in an operation log corresponding to a time after a predetermined period has passed since the time at which the first positional information corresponding to the first user was received is equal to the first electrical device, third operation information in which the operation log corresponding to the time after the predetermined period has passed is associated with the first user.

15. The method according to claim 1, further comprising:
generating, in a case where an electrical device indicated in an operation log corresponding to a time after a predetermined period has passed since the time at which the first positional information corresponding to the first user was received is equal to the first electrical device, fourth operation information in which an operation log corresponding to a time within the predetermined period from the time at which the predetermined period has passed is associated with the first user.

16. The method according to claim 1,
wherein the first user and a second user are included in multiple users,
wherein second positional information is received from a second terminal of the second user, and
wherein in a case where the first positional information and the second positional information are received at the same time, the determination is not performed who entered the building from outside of the building.

17. The method according to claim 1, wherein the first positional information further includes an ID of the first terminal of the first user, the method further comprising:
estimating, based on the ID of the first terminal of the first user, the first user corresponding to the first positional information.

18. The method according to claim 17, wherein a second user is included in multiple users, and the method further comprising:
receiving second positional information indicating a current position of a second terminal of the second user, the second terminal of the second user being carried or worn by the second user; and
estimating that the second user is not an operator of a second electrical device indicated by a second operation log corresponding to the time at which the second positional information was received, when it is determined that a current position indicated in the second positional information is the predetermined distance or more away from the position of the building.

19. The method according to claim 1,
wherein the first positional information is received with predetermined time intervals, and
wherein the predetermined time intervals change in accordance with the distance between the current position indicated in the first positional information and the position of the building.

20. An apparatus for estimating an operator of multiple electrical devices, the multiple electrical devices being installed in a building, the apparatus comprising:
a memory storing a program; and
control circuitry that executes the program to:
receive, from each of the multiple electrical devices, an operation log indicating that a corresponding electrical device was operated, the operation log including i) an ID of the corresponding electrical device and ii) a time at which the corresponding electrical device was operated;
receive first positional information indicating a current position of a first terminal of a first user, the terminal of the user being carried or worn by the first user;
determine, in a case where a distance between the current position indicated in the first positional information and a position of the building is a predetermined distance or less, that the first user entered the building from outside of the building; and
estimate that the first user is an operator of a first electrical device based on the time at which the first electrical device was operated as recorded in a first operation log received from the first electrical device, when it is determined that the first user entered the building from outside of the building.

21. A non-transitory computer-readable recording medium storing a program for causing a processor to execute the method according to claim 1.

* * * * *